(12) United States Patent
Brant et al.

(10) Patent No.: US 7,655,317 B2
(45) Date of Patent: Feb. 2, 2010

(54) STRETCH-CLING FILMS

(75) Inventors: Patrick Brant, Seabrook, TX (US); Srivatsan Srinivas, Pearland, TX (US); Paul Masten German, Friendswood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 668 days.

(21) Appl. No.: 11/039,090

(22) Filed: Jan. 19, 2005

(65) Prior Publication Data

US 2006/0159943 A1    Jul. 20, 2006

(51) Int. Cl.
  *B32B 27/08*    (2006.01)
  *B32B 15/04*    (2006.01)
(52) U.S. Cl. .................. 428/515; 428/355 RA
(58) Field of Classification Search ........... 428/516, 428/355 RA
  See application file for complete search history.

(56) References Cited

U.S. PATENT DOCUMENTS

| | | | |
|---|---|---|---|
| 4,518,654 A | 5/1985 | Eichbauer et al. | |
| 5,049,423 A * | 9/1991 | German, Jr. | ................ 428/35.2 |
| 5,085,927 A | 2/1992 | Dohrer | |
| 5,114,763 A | 5/1992 | Brant et al. | |
| 5,141,809 A * | 8/1992 | Arvedson et al. | ............ 428/349 |
| 5,154,981 A | 10/1992 | Brant et al. | ................ 428/520 |
| 5,173,343 A | 12/1992 | Arvedson et al. | ........... 428/34.9 |
| 6,500,563 B1 * | 12/2002 | Datta et al. | ................ 428/521 |
| 6,750,284 B1 * | 6/2004 | Dharmarajan et al. | ....... 524/515 |
| 6,982,310 B2 * | 1/2006 | Datta et al. | ................ 526/348 |
| 6,984,696 B2 * | 1/2006 | Curry et al. | ................ 525/191 |
| 7,026,403 B2 * | 4/2006 | Dharmarajan et al. | ....... 525/240 |
| 7,049,372 B2 * | 5/2006 | Datta et al. | ................ 525/240 |
| 7,122,603 B2 * | 10/2006 | Datta et al. | ................ 525/240 |
| 7,132,478 B2 * | 11/2006 | Datta et al. | ................ 525/191 |
| 2006/0062980 A1 * | 3/2006 | Iyer | ........................... 428/212 |

FOREIGN PATENT DOCUMENTS

| | | |
|---|---|---|
| EP | 0 333 508 | 2/1994 |
| EP | 1 201 406 | 10/2002 |
| WO | 91/06426 | 5/1991 |
| WO | WO 95/16729 | 6/1995 |

* cited by examiner

*Primary Examiner*—Sheeba Ahmed

(57) ABSTRACT

The invention concerns films having a cling layer of an elastomeric propylene-based polymer with a low heat of fusion derived from isotactic propylene type crystallinity, as determined by DSC of less than 40 J/g, optionally blended with a crystalline isotactic propylene derived polymer having a heat of fusion over 70 J/g and/or a melting point of at least 120° C. as determined by DSC, and a non-cling layer of a polyolefin. The cling layer may contain other components such as crystalline polypropylene.

20 Claims, No Drawings

STRETCH-CLING FILMS

FIELD OF INVENTION

The invention relates to a thermoplastic film useful in stretch-cling applications for bundling, packaging and unitizing of foods and other goods.

BACKGROUND

The background description of WO 95/16729 is relevant here also.

Stretch/cling films have wide application, including bundling packaged food and other goods. One application of particular interest is in the bundling of goods for shipping and storage, for example, the bundling of large rolls of carpet, fabric, or the like. A film having cling properties to prevent unraveling of the film from the pallet is therefore desirable. To impart cling properties or improve the cling properties of a particular film, a number of techniques have been employed, such as the addition of tackifying additives or use of polar ethylene copolymers such ethylene acrylates in the (co) polymer. Common tackifying additives include polybutenes, terpene resins, alkali metal and glycerol stearates and oleates and hydrogenated rosins and rosin esters.

Multilayer films offer the advantage of imparting several properties not easily obtained from a single layer. See U.S. Pat. No. 4,518,654 and U.S. Pat. No. 5,114,763, which are incorporated by reference. With a multilayer film, a stretch/cling wrap can have cling properties on one side and, for example, slip properties on the other. It is desirable to have a film having cling properties without the adverse effects found with existing film structures and tackifying additives detailed above.

SUMMARY

The film has a cling layer of a propylene-ethylene interpolymer, optionally blended with more crystalline polypropylene. The film may have a non-cling layer of a polyolefin with reduced levels of or essentially free of tackifier, and optionally include an anti-cling (slip and/or antiblock) additive. Preferred polyolefins include linear low-density polyethylene and polypropylene homo or random copolymer having up to 10 wt % of ethylene.

The Cling Imparting Polymer

The stretch-cling film may be of a composition, which comprises a cling layer base of a propylene-based elastomeric polymer or a blend of such an elastomeric polymer with a more crystalline polypropylene. The film may have a non-cling layer that is based on polypropylene. In embodiments where the cling layer comprises a blend of a propylene based elastomeric polymer and a crystalline polypropylene homo or copolymer, the propylene-based elastomeric polymer is preferably present in the blend from at least 50 wt %, 70-95 wt %, more preferably from 80-95 wt %, more preferably from 80-90 wt %, more preferably from 85-95 wt % based on the weight of the blend, with the balance comprising the crystalline polypropylene homo or copolymer in an amount greater than or equal to 5 wt %.

Propylene based elastomeric polymers are produced by random polymerization processes leading to polymers having randomly distributed irregularities in stereoregular propylene propagation. This is in contrast to block copolymers in which constituent parts of the same polymer chains are separately and sequentially polymerized.

The term "elastomeric polymer" indicates that the heat of fusion of the polymer as determined by DSC is less than 75 J/g. Generally the melting point as determined by DSC will below 105° C. This is in contrast to propylene copolymers or atactic polymers containing propylene derived units, which lack recovery from elastic deformation.

The polymer is "propylene based" in the sense that the amount of propylene in the polymer is for propylene sequences to crystallize to give rise to a detectable heat of fusion. This is in contrast with known elastomeric polymers based on ethylene and propylene in which the heat of fusion can be attributed to ethylene derived polymer sequences. Preferably the polymers contain isotactic propylene sequences, separated by stereo or regio error or by one or more units from a comonomer.

Preferred Heat of Fusion

The polymers and compositions described herein can be characterized in terms of their melting points (Tm) and heats of fusion, which properties can be influenced by the presence of comonomers or steric irregularities that hinder the formation of crystallites by the polymer chains.

The heat of fusion preferably ranges from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g. Here and everywhere else, any lower range end may be combined with an upper range end to provide alternative ranges.

If the heat of fusion is too high, the polymer may not extend elastically under a sufficiently low force for elastic deformation and have insufficient elastic elongation. If the heat of fusion is too low the polymer may not show a sufficient return force after elastic deformation.

The heat of fusion can be reduced by using additional comonomer, higher polymerization temperatures and/or a different catalyst providing reduced levels of steric constraints and favoring more propagation errors for propylene insertion.

The properties can be determined by Differential Scanning Calorimetry (DSC), using the ASTM E-794-95 (version E-794-01).

About 6 to 10 mg of a sheet of the polymer pressed at approximately 200° C. to 230° C. is removed with a punch die and annealed at room temperature for 48 hours. At the end of this period, the sample is placed in a Differential Scanning Calorimeter (Perkin Elmer Pyris Analysis System and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The temperature of the greatest heat absorption within the range of melting of the sample is recorded as the melting point.

A crystallinity percentage can be calculated from the heat of fusion relative to the heat of fusion of an ideal polypropylene material with maximum crystallinity.

Randomness by Isotacticity Index

The term "tacticity" refers to the stereoregularity of the orientation of the methyl residues from propylene in a polymer. The term "isotactic" as in isotactic polypropylene is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane.

Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three-monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer and is referred to herein as the triad tacticity.

The propylene-derived units of the propylene elastomer have an isotactic triad fraction of about 65% to about 99%. Advantageously the propylene-derived units of the propylene elastomer have an isotactic triad fraction of 70% to 98%. In still another embodiment, the propylene-derived units of the propylene elastomer have an isotactic triad fraction of 75% to 97%.

If the triad tacticity is too high, the level of stereo-irregular disruption of the chain is too low and the elastic properties will suffer. If the triad tacticity is too low, there is insufficient potential for the progressive crystallization of the polymer.

The "triad tacticity" of the polymers described herein can be determined from a $^{13}$C nuclear magnetic resonance (NMR) spectrum of the polymer as described in U.S. Pat. No. 5,504,172, and U.S. Pat. No. 6,642,316, column 6, lines 38 through column 9, line 18, which patents are hereby incorporated by reference in their entirety.

The tacticity index, expressed herein as "m/r", is determined by $^{13}$C nuclear magnetic resonance (NMR). The tacticity index m/r is calculated as defined in H. N. Cheng, *Macromolecules,* 17, 1950 (1984). An m/r ratio of 1.0 generally describes a syndiotactic polymer, and an m/r ratio of 2.0 generally describes an atactic material. An isotactic material theoretically may have a ratio approaching infinity, and many by-product atactic polymers have sufficient isotactic content to result in ratios of greater than 50.

The triad tacticity and tacticity index may be controlled by the catalyst influencing the stereoregularity of propylene placement, the polymerization temperature according to which stereoregularity can be reduced by increasing the temperature and by the type and amount of a comonomer which tends to disrupt reduce the level of longer propylene derived sequences.

Control of Random Polymer Structure

Preferably the polymer contains at least some comonomer, such as an alpha-olefin, in order to facilitate control of the structure. Preferably the comonomer comprises substantially ethylene which can aid in achieving economic polymerization conditions by raising the molecular weight and/or permitting a raising of the polymerization temperature.

Generally the combined amount of the ethylene and/or alpha-olefin varies from 5 to 30 wt % %, preferably from 10 to 20 wt % and especially from 12 to 20 wt %. Other suitable ranges of the ethylene and/or other alpha-olefin include 5-20 wt %, 5-15 wt %, 5.5-10.5 wt %, 6-10 wt %, 8-10 wt % and 8.5-10 wt %. Too much comonomer will reduce the crystallinity provided by the crystallization of stereoregular propylene derived sequences to the point where the material lacks elastic recovery; too little and the material will be too crystalline, have a high melting point and be insufficiently elastic.

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever is higher. For propylene ethylene copolymers having 75 wt % or less propylene content, the comonomer (ethylene) content can be measured using the procedure described in the Wheeler and Willis.

The polymer may also contain polyenes to facilitate functionalization and/or cross-linking.

The polymer may incorporate from 1 wt. % to 12 wt. % of polyene-derived units, based on the combined weight of the propylene-derived units and the alpha-olefin-derived units, if any, excluding the polyenes (This is the result of the generally practiced measurement technique prescribed by ASTM. Procedure used to determine polyene content). Preferably the polymer incorporates from 1.0 wt. % to about 9.0 wt. % of polyene-derived units. The polyene-derived units may be derived from a diene such as 5-ethylidene-2-norbornene which has one polymerizable bond that can be incorporated during polymerization and is not prone to branch formation because the other group is not so polymerizable. The polyene may also be a diene such 5-vinyl-2-norbornene or divinyl benzene in which both bonds can polymerize and long chain branches can be produced.

The amount of the polyene present in the polymeric components can be inferred by the quantitative measure of the amount of the pendent free olefin present in the polymer after polymerization. Several procedures such as iodine number and the determination of the olefin content by 1H or 13C NMR have been established. In the particular case where the polyene is ENB the amount of polyene present in the polymers can be measured using ASTM D3900. The amount of polyene present is expressed on the basis of the total weight of (for example) ethylene and propylene derived units.

The catalyst may also control the stereoregularity in combination with the comonomer and the polymerization temperature. The catalyst should however be capable of a level of stereoregular placement, generally by suitable chirality of the single site catalyst. The polymer can be prepared using any single sited catalyst. Such a catalyst may be a transition metal complex generally containing a transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

The ancillary ligand may be a structure capable of forming a π bond such a cyclopentadienyl type ring structure. The ancillary ligand may also be a pyridinyl or amide ligand. The transition metal is preferably of Group 4 of the Periodic table such as titanium, hafnium or zirconium which are used in polymerization in the $d^0$ mono-valent cationic state and have one or two ancillary ligands as described in more detail hereafter. The important features of such catalysts for coordination polymerization are the ligand capable of abstraction and that ligand into which the ethylene (olefinic) group can be inserted.

The manner of activation of the single site catalyst can vary. Alumoxane and preferably methyl alumoxane can be used suitably in an amount to provide a molar aluminum to metallocene ratio of from 1:1 to 20,000:1. Higher molecular weights can be obtained using non- or weakly coordinating anion activators (NCA) derived and generated in any of the ways amply described in published patent art such as EP 277 004, EP 426 637, and many others. The non-coordinating anion can be a Group 10-14 complex wherein boron or aluminum is the charge-bearing atom shielded by ligands, which may be halogenated, and especially perfluorinated. Preferably tetra-aryl-substituted Group 10-14 non-carbon element-based anion, especially those that are have fluorine groups substituted for hydrogen atoms on the aryl groups, or on alkyl substituents on those aryl groups.

An activation step generally forms the catalytically active ion pair from neutral precursors. This reaction may involve abstraction of an anionic group such as the methyl group to form a metallocene cation, although according to some literature zwitterions may be produced. The NCA precursor may be an ion pair of a borate or aluminate in which the precursor cation is eliminated upon activation in some manner, e.g. trityl or ammonium derivatives of tetrakis pentafluorophenyl boron (See EP 277 004). The NCA precursor can be a neutral compound such as a borane, which is formed into a cation by the abstraction of and incorporation of the anionic group abstracted from the metallocene (See EP 4266 38). A precursor for the non-coordinating anion may be used with a transition metal complex supplied in a reduced valency state. The precursor may undergo a redox reaction. The precursor cation may be a triphenyl carbenium derivative as in EP 426 637.

The non-coordinating anion may be used in approximately equimolar amounts relative to the transition metal complex, such as at least 0.25, preferably 0.5, and especially 0.8 and such as no more than 4, preferably 2 and especially 1.5.

The transition metal complex for the single site catalyst may be a pyridine amine complex useful for olefin polymerization such as those described in WO03/040201. The transition metal complex may a fluxional complex, which undergoes periodic intra-molecular re-arrangement so as to provide the desired interruption of stereoregularity as in U.S. Pat. No. 6,559,262. The transition metal complex may be a stereorigid complex with mixed influence on propylene insertion, see Rieger EP 1 070 087.

Preferably the transition metal complex is a chiral metallocene catalyst with an activator and optional scavenger. Mono-anionic ligands of the metallocene are displaceable by a suitable activator to permit insertion of a polymerizable monomer or macro-monomer can insert for coordination polymerization on the vacant coordination site of the transition metal component. Such metallocenes are described in U.S. Pat. No. 6,048,950 which discloses bis(indenyl)bis(dimethylsilyl) zirconium dichloride and MAO; WO 98/27154 which discloses a dimethylsilyl bridged bis-indenyl hafnium di-methyl together with a non-coordinating anion activator. EP 1 070 087 discloses a bridged biscyclopentadienyl catalyst which has elements of asymmetry between the two cyclopentadienyl ligands to give a polymer with elastic properties.

Also available are the metallocenes described in U.S. Pat. Nos. 6,448,358 and 6,265,212, U.S. Pat. Nos. 5,198,401 and 5,391,629.

Possible other single site catalysts are metallocenes, such as those described in U.S. Pat. No. 5,026,798, which have a single cyclopentadienyl ring, advantageously substituted and/or forming part of a polycyclic structure, and a heteroatom, generally a nitrogen atom, but possibly also a phosphorus atom or phenoxy group connected to a group 4 transition metal, preferably titanium but possibly zirconium or hafnium. A further example is $Me_5CpTiMe_3$ activated with $B(CF)_3$ as used to produce elastomeric polypropylene with an Mn of up to 4 million. See Sassmannshausen, Bochmann, Rosch, Lilge, J. Organomet. Chem. (1997) 548, 23-28.

When using the catalysts, the total catalyst system will generally additionally comprise one or more organo-metallic compound as scavenger. Such compounds as used in this application is meant to include those compounds effective for removing polar impurities from the reaction environment and for increasing catalyst activity.

The polymerization reaction is conducted by reacting monomers in the presence of a catalyst system described herein at a temperature of from 0° C. to 200° C. for a time of from 1 second to 10 hours. Preferably homogeneous conditions are used such as a continuous solution process or a bulk polymerization process with excess monomer used as diluent. Preferably the continuous process uses some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

As noted elsewhere herein, polymerizations in the different reactors may in certain embodiments be conducted in the presence of the same catalyst mixtures, and in other embodiments be conducted in the presence of different catalyst mixtures. As used herein, the term "catalyst mixture" (catalyst system) includes at least one catalyst and at least one activator, although depending on the context, any reference herein to "catalyst" usually also implies an activator as well.

The appropriate catalyst mixture may be delivered to the respective reactor as a solution or slurry, either separately to the reactor, activated in-line just prior to the reactor, or pre-activated and pumped as an activated solution or slurry to the reactor. Dual reactors may be used in series or parallel, see U.S. Pat. No. 6,207,756, column 8 line 20 through column 14, line 21.

Other General Characteristics

The elastomeric propylene-based polymer preferably has an MFR of 0.5 to 200, especially from 1 to 100 or more especially 1 to about 50. The term "MFR" as used herein stands for "Melt Flow Rate" and is used to characterize polymers, components and compositions. The units for "MFR" are grams per 10 minutes and the test to be herein for determining MFR is set forth in any version and condition set forth in ASTM-1238 that uses 2.16 kg at 230° C. with a 1 minute preheat on the sample to provide a steady temperature for the duration of the experiment. This data expressed as dg of sample extruded per minute is indicated as MFR. In an alternative procedure, the test is conducted in an identical fashion except at a temperature of 190° C. This data is referred to as MI@190° C. Where the MFR is so low as to defy measurement under these conditions, molecular weight may be determined using Mooney.

The Mooney viscosity, as used herein, is measured as ML(1+4) @ 125° C. according to ASTM D1646. As used herein, the term Mooney Viscosity (ML (1+4) @ 125° C.), or simply "Mooney Viscosity," is to be defined and measured according to the definition and measurement procedure set forth in U.S. Pat. No. 6,686,415, which is hereby incorporated by reference in its entirety, but particularly the text found in column 6, line 59 through column 7, line 59. Alternatively, any "Mooney Viscosity" value referenced herein (including those in the claims) is deemed to encompass any Mooney Viscosity measured in accordance with any recognized, published procedure for measuring Mooney Viscosity.

The elastomeric propylene-based polymer can have a molecular weight distribution $M_w/M_n$ (MWD), sometimes referred to as a "polydispersity index" (PDI), within the range having an upper limit of 40, or 20, or 10, or 5, or 4.5, and a lower limit of 1.5, or 1.8, or 2.0. The various molecular weight characteristics (e.g., Mw and Mn) and molecular weight distribution Mw/Mn (MWD) of the polymer components (or polymers) described herein can be measured in accordance with the procedures disclosed in U.S. Pat. No. 6,525,157, column 5, lines 1-44, which patent is hereby incorporated by reference in its entirety. Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards to the retention volume of the polymer tested yields the polymer molecular weight. Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems 3rd ed.*, Hemisphere Pub. Corp., NY, (1989) 155-160; U.S. Pat. No. 4,540,753; Verstrate et al., *Macromolecules*, vol. 21, (1988) 3360; and references cited therein.

Physical Properties of the Polymer

The elastomeric propylene-based polymer has a number of properties that help contrast its behavior in finished end use articles compared with other propylene-based polymers on the one hand and ethylene based elastomers on the other hand. Tensile properties may be measured by ASTM method D-412 and the polymer can show considerable strength once extended, believed to be due to the progressive formation of propylene based crystalline areas. The tear strength may be high and can be measured using ASTM method D-624 for similar reasons. The Flexural Modulus can be measured using ASTM method D-790 and will demonstrate considerable flexibility and fatigue resistance. Similarly, hardness measured using ASTM method D-2240 can be low as can the Vicat softening point measured using ASTM method D-1525. The density in g/cc is determined in accordance with ASTM 1505, based on ASTM D-1928, procedure C, plaque preparation, and indicates only a moderate crystallinity.

The elastomeric propylene-based polymer can show controlled miscibility with other polymers depending on the molecular weight, the level of crystallinity and the monomer content.

Details of Possible Film Structures

The same structures can employed as in WO95/16729. The stretch conditions and other factors may affect cling including the type of comonomer incorporated, the thickness of the film measured, the stretch, load, and force applied on the film, and the extractables content of the copolymer and resulting film. For purposes of this invention, tackifying additives are defined herein as substances which provide sticky or adhesive qualities to copolymers, surfaces, films, or articles. Compressor oils and processing stabilizers such as antioxidants, UV stabilizers, antiblock agents and the like are excluded from this definition. Compatible tackifying additives, if used, would be which are miscible, or form homogeneous blends with the polymers of the cling layer at conditions of fabrication and use. A wide variety of tackifying additives are known in the art and include, for example, polybutenes, polyisobutylenes, atactic polypropylenes, terpene resins, aliphatic and aromatic hydrocarbon resins, alkali metal and glycerol stearates, hydrogenated rosins. For more details on tackifiers, see U.S. Pat. Nos. 5,114,763, 5,154,981, 5,173,343, and, 5,175, 049. Notwithstanding this definition of tackifiers, an object of this invention is to provide a means of generally obtaining cling in a film of an ethylene non-acrylate copolymer essentially free of added tackifier.

Preferred cling films have a cling force in the stretched state, especially absent essentially any added tackifier. "Essentially free of tackifying additives" is defined as being less than 1 weight % tackifier. "Stretched state" is defined as a film being about or greater than 50% stretched, preferably greater than about 100% and most preferably about or greater than 200% stretched.

Preferred films of the invention may be single- or multiple-layer films. The latter films may consist of one or more layers formed from ethylene copolymers and blends thereof The films may also have one or more additional layers formed from other polymers such as polypropylene, polyester and EVOH, metal foils, paper and the like, or HDPE, LLDPE, EVA, HP-LDPE.

Films may be formed by any number of well-known extrusion or coextrusion techniques. For example, any of the blown or cast film techniques are suitable. As an embodiment of the invention, the copolymers may be extruded in a molten state through a flat die and then cooled. Alternatively, the copolymers may be extruded in a molten state through an annular die and then blown and cooled to form a tubular film. The tubular film may be axially slit and unfolded to form a flat film. The films of the invention may be unoriented, uniaxially oriented or biaxially oriented. Physical properties of the film may vary depending on the film forming techniques employed.

Multiple-layer films may be formed by methods well known in the art. If all layers are copolymers, the copolymers may be coextruded through a coextrusion feed-block and die assembly to yield a film with two or more layers adhered together but differing in composition. Multiple-layer films may also be formed by extrusion coating whereby a substrate material is contacted with the hot molten polymer as the polymer exits the die. For instance, an already formed polypropylene film may be extrusion coated with a copolymer film as the latter is extruded through the die. Multiple-layer films may also be formed by combining two or more single layer films prepared as described above. The total thickness of multilayer films may vary based upon the application desired. A total unstretched film thickness of about 0.4 to about 2.5 mils (about 10-63 microns), preferably from about 0.8 to about 2.0 mils (about 20-50 microns) is suitable for most applications.

There are many potential applications of films produced from the present copolymers. These films can be made into other forms, such as tape, by any one of a number of well known cutting, slitting, and/or rewinding techniques. They may be useful as sealing, or oriented films. Typical articles suitable for bundling, packaging and unitizing include various foodstuffs (canned or frozen), rolls of carpet, liquid containers and various like goods normally containerized and/or palletized for shipping, storage, and/or display. The films may also be used in surface protection applications with or without stretching. The films are effective, especially in the temporary protection, of surfaces during manufacturing, transportation, etc. The surfaces of the film of this invention can be modified by such known and conventional post-forming techniques such as flame treatment, corona discharge, chemical treatment etc.

EXAMPLES

The cling force can be determined as described in WO 95/16729.

The film compositions in Table 2 were prepared. Four different coextruded structures were prepared using PP 1012 from ExxonMobil Chemical Company as the non-cling layer. The films were prepared by coextruding the cling composition and PP 1012 on a Killion cast film line with two ¾" die slot extruders. The extruder conditions are shown in Table 3 for the various samples. The resulting films had a thickness of approximately 1 mil of which the PP layer comprised 85% of the film thickness. The inside layer to outside layer (I/O) cling was measured for 0% and 200% stretch. The results are shown in Table 4. With the exception of the cling layer containing a propylene copolymer with a relatively low amount of ethylene (12 wt % C2), the other samples showed high cling forces. This low cling is due to the high degree of crystallinity (high modulus) of this sample.

TABLE 1

Polymers used in Cling Layer

| | Type | MFR (230° C.) | MI (190° C.) | C2 (wt %) | Density (gm/cm$^3$) |
|---|---|---|---|---|---|
| PP 1012 | Polypropylene | 5 | | | |
| FPC1 | Propylene Copolymer | 10 | | 12 | |
| FPC2 | Propylene Copolymer | 7 | | 14 | |
| FPC3* | Propylene Copolymer | 2.9 | | | |
| EXACT 4049 | Ethylene Copolymer | | 4.5 | | 0.873 |

*FPC3 was made by blending Propylene copolymer with 17 wt % C2 with PP4292 (3 MFR Homopolypropylene available from ExxonMobil Chemical Company) in the ratio 85:15 by weight

TABLE 2

Cling Film compositions prepared

| | 1 | 2 | 3 | 4 |
|---|---|---|---|---|
| PP 1012 | 85 | 85 | 85 | 85 |
| FPC1 | 15 | | | |
| FPC2 | | 15 | | |
| FPC3 | | | 15 | |
| EXACT 4049 | | | | 15 |
| THICKNESS (mil) | 1.0 | 1.0 | 1.0 | 1.0 |

TABLE 3

Killion line processing conditions for coextruded films

| | 1 | | 2 | | 3 | | 4 | |
|---|---|---|---|---|---|---|---|---|
| | A | B | A | B | A | B | A | B |
| Zone 1 Temp (° C.) | 155 | 123 | 154 | 124 | 153 | 123 | 153 | 124 |
| Zone 2 Temp (° C.) | 203 | 174 | 205 | 174 | 204 | 176 | 206 | 177 |
| Zone 3 Temp (° C.) | 219 | 203 | 218 | 205 | 219 | 194 | 218 | 194 |
| Adapter 1 Temp (° C.) | 205 | 210 | 205 | 211 | 205 | 204 | 205 | 204 |
| Adapter 2 Temp (° C.) | 204 | 222 | 204 | 219 | 204 | 205 | 204 | 205 |
| Die/Feedblock Temp (° C.) | 204 | 204 | 204 | 204 | 204 | 204 | 204 | 204 |
| Melt Temp (° C.) | 212 | 199 | 212 | 196 | 212 | 193 | 211 | 192 |
| Extruder Speed (RPM) | 117 | 13 | 119 | 13 | 117 | 13 | 116 | 13 |
| Extruder Drive (Amps) | 5.0 | 2.0 | 5.5 | 2.0 | 5.5 | 2.0 | 5.0 | 1.0 |
| Line Speed (fpm) | 21.3 | | 20.7 | | 20.2 | | 20.2 | |
| Chill Roll Temp (° C.) | 26 | | 25 | | 24 | | 23 | |
| Gauge (μm) | 30 | | 25 | | 25 | | 25 | |

Extruder A—PP1012
Extruder B—FPC or EXACT

TABLE 4

Cling values for films of current invention

| | 1 | 2 | 3 | 4 |
|---|---|---|---|---|
| 0% Stretch | 1.5 | 264 | 491 | 761 |
| 200% Stretch | 13 | 230 | 238 | 791 |

Performance: The results show that the films of this invention exhibit good cling properties. For example, cling films of LLDPE blended with tackifier and coextruded with PP show cling values of 150 gm/inch (5.9 kg/m) (U.S. Pat. No. 5,114,763). Cling films of EMA blended with tackifier and coextruded with iPP (isotactic polypropylene) show cling values of 220-420 gm/inch (8.7-16.5 kg/m) (U.S. Pat. No. 5,141,809). Cling films of EMA blended with tackifier and coextruded with PP show cling values of 60-688 gm/inch (2.4-27.1 kg/m) (U.S. Pat. No. 5,154,981). Cling films of EMA blended with tackifier and coextruded with LLDPE show cling values of 20-175 gm/inch (0.8-6.9 kg/m) (U.S. Pat. No. 5,173,343).

The invention claimed is:

1. A film comprising:
    a non-cling layer comprising linear low-density polyethylene having a density of from 0.91 to 0.94 g/cm$^3$ and a polypropylene homopolymer or random copolymer having up to 10 wt % of ethylene; and
    a cling layer of an elastomeric propylene-based polymer with a heat of fusion as determined by DSC of less than 40 J/g, optionally blended with a crystalline isotactic propylene derived polymer having a heat of fusion over 70 J/g and/or a melting point of at least 120° C. as determined by DSC.

2. A film according to claim 1 in which the cling layer comprises at least 50 wt % of the crystalline isotactic propylene derived polymer and at least 5 wt % of the elastomeric propylene-based polymer.

3. A film according to claim 1 wherein the cling layer further comprises from 2 to 50 wt % based on the total weight of the cling layer of an ethylene interpolymer having ethylenic type crystallinity and a heat of fusion of less than 75 J/g.

4. A film according to claim 2 wherein the cling layer further comprises from 2 to 50 wt % based on the total weight of the cling layer of an ethylene interpolymer having ethylenic type crystallinity and a heat of fusion of less than 75 J/g.

5. A film according to claim 1 wherein the cling layer comprises from 2 to 20 wt % based on the total weight of the cling layer of a tackifying additive other than a hydrocarbon resin.

6. A film according to claim 1 wherein the cling layer comprises less than 1 wt % of a tackifying additive.

7. A film according to claim 1 wherein the cling layer comprises an anti-cling, slip and/or anti-block additive.

8. A film according to claim 1 wherein the cling layer consists essentially of the elastomeric propylene-based polymer and said crystalline isotactic propylene derived polymer.

9. The film according to claim 1 wherein the elastomeric propylene-based polymer comprises 5-30 wt % ethylene derived units.

10. The film according to claim 1 wherein the elastomeric propylene-based polymer comprises 14-30 wt % ethylene derived units.

11. The film according to claim 1 wherein the elastomeric propylene-based polymer comprises 5-15 wt % ethylene derived units.

12. The film according to claim 11 wherein the elastomeric propylene-based polymer comprises 5.5-10.5 wt % ethylene derived units.

13. The film according to claim 1 wherein the elastomeric propylene-based polymer comprises 6-10 wt % ethylene derived units.

14. The film according to claim 1 wherein the elastomeric propylene-based polymer comprises 8.5-10 wt % ethylene derived units.

15. The film according to claim 1 having a cling force at 200% stretch of 2.0 kg/m (50 g/inch) to 5.9 kg/m (150 g/inch).

16. A film comprising:
    at least one non-cling layer comprising linear low-density polyethylene having a density of from 0.91 to 0.94 g/cm$^3$; and
    at least one cling layer comprising:
        at least one elastomeric propylene-based polymer having 14-30 wt % ethylene derived units and a heat of fusion of less than 60 J/g as determined by DSC; and
        at least one crystalline isotactic propylene derived polymer having a heat of fusion over 70 J/g as determined by DSC.

17. The film of claim 16, wherein the crystalline isotactic propylene derived polymer has a melting point of at least 120° C. as determined by DSC.

18. A film comprising:
    at least one non-cling layer comprising linear low-density polyethylene having a density of from 0.91 to 0.94 g/cm$^3$; and
    at least one cling layer comprising:
        about 70 wt % to about 95 wt % of at least one elastomeric propylene-based polymer having 14-30 wt % ethylene derived units and a heat of fusion of less than 60 J/g as determined by DSC; and
        about 5 wt % to about 30 wt % of at least one crystalline isotactic propylene derived polymer having a heat of fusion over 70 J/g as determined by DSC.

19. The film of claim 18, wherein the non-cling layer further comprises a polypropylene homopolymer or a random copolymer having up to 10 wt % of ethylene, and the at least one elastomeric propylene-based polymer has a MWD of from 1.5 to 40.

20. The film of claim 19, wherein the crystalline isotactic propylene derived polymer has a melting point of at least 120° C. as determined by DSC, and the at least one elastomeric propylene-based polymer has a MFR of from 1 g/10 mm to 50 g/10 min, as measured by ASTM 1238.

* * * * *

UNITED STATES PATENT AND TRADEMARK OFFICE
CERTIFICATE OF CORRECTION

PATENT NO. : 7,655,317 B2  Page 1 of 1
APPLICATION NO. : 11/039090
DATED : February 2, 2010
INVENTOR(S) : Brant et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this

Twenty-third Day of November, 2010

David J. Kappos
*Director of the United States Patent and Trademark Office*